United States Patent
Huguenel et al.

(10) Patent No.: US 8,139,882 B2
(45) Date of Patent: Mar. 20, 2012

(54) METHOD FOR LOCALLY ADJUSTING A QUANTIZATION STEP AND CODING DEVICE IMPLEMENTING SAID METHOD

(75) Inventors: Lila Huguenel, Rennes (FR); Dominique Thoreau, Cesson Sevigne (FR); Philippe Guillotel, Vern sur Seiche (FR)

(73) Assignee: Thomson Licensing, Issy les Moulineaux (FR)

( * ) Notice: Subject to any disclaimer, the term of this patent is extended or adjusted under 35 U.S.C. 154(b) by 759 days.

(21) Appl. No.: 11/887,860

(22) PCT Filed: Mar. 16, 2006

(86) PCT No.: PCT/EP2006/060804
§ 371 (c)(1),
(2), (4) Date: Dec. 9, 2008

(87) PCT Pub. No.: WO2006/106032
PCT Pub. Date: Oct. 12, 2006

(65) Prior Publication Data
US 2009/0169125 A1    Jul. 2, 2009

(30) Foreign Application Priority Data
Apr. 5, 2005 (FR) ...................... 05 03369

(51) Int. Cl.
*G06K 9/00* (2006.01)
(52) U.S. Cl. .................... 382/251; 375/240.03
(58) Field of Classification Search .......... None
See application file for complete search history.

(56) References Cited

U.S. PATENT DOCUMENTS
6,490,319 B1  12/2002  Yang
6,744,927 B1*  6/2004  Kato .............................. 382/239

FOREIGN PATENT DOCUMENTS
WO    WO 97/37322    10/1997

OTHER PUBLICATIONS

O. Deforges and J. Ronsin, "Region of Interest Coding for Low Bit Rate Image Transmission", Aug. 2002, IEEE International Conference on Multimedia and Expo, vol. 1, pp. 107-110.*
D. Chai et al.: "Foreground/background bit allocation for region-of-interest coding" Image Processing, 2000. Proceedings. 2000 Int'l Conference on Sep. 10-13, 2000, Piscataway,NJ. USA, IEEE, vol. 2, Sep. 10, 2000, pp. 923-926.
Search Report Dated May 29, 2006.

* cited by examiner

*Primary Examiner* — Jason M Repko
*Assistant Examiner* — Siamak Harandi
(74) *Attorney, Agent, or Firm* — Robert D. Shedd; Jeffrey M. Navon

(57) ABSTRACT

The invention relates to a method of locally adjusting a quantization step for each region of an image in a sequence of n images. The method comprises the following steps; calculating, for each image of the sequence, a first difference of bits saved on the potential masking region when quantizing it with a first quantization step and a second difference of bits required by the region of interest when quantizing it with a second quantization step; and in each image of the sequence, assigning to the potential masking region the first quantization step and if the sum of the n first differences of bits is higher than the sum of the n second differences of bits assigning said second quantization step to said region of interest and otherwise assigning a third quantization step such that the sum of said n first differences of bits is distributed between the regions of interest according to a reconstruction quality criterion.

8 Claims, 1 Drawing Sheet

Figure 1:
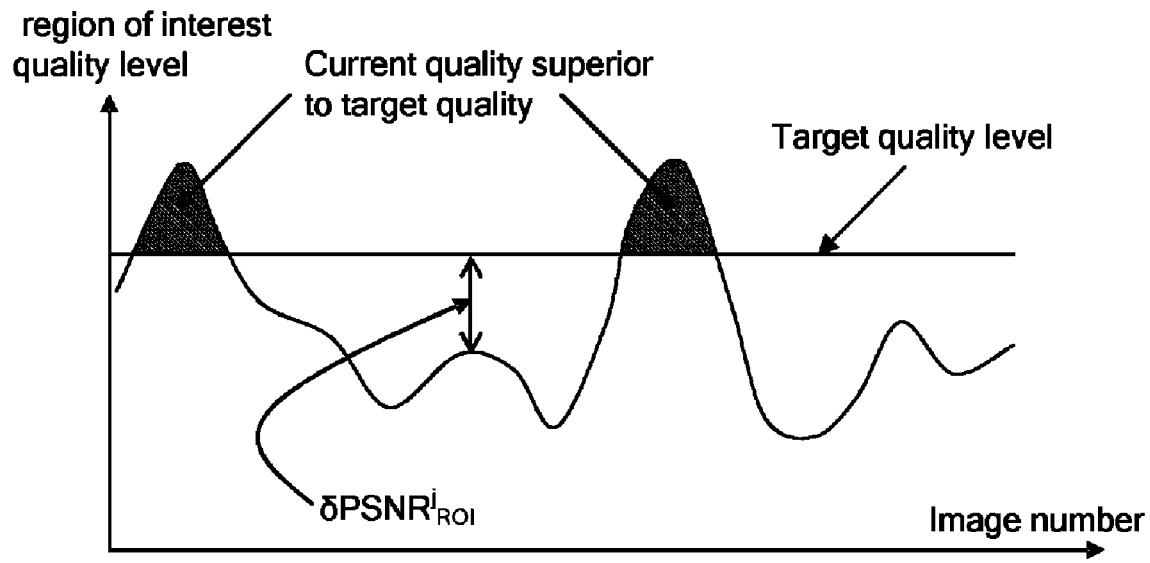

METHOD FOR LOCALLY ADJUSTING A QUANTIZATION STEP AND CODING DEVICE IMPLEMENTING SAID METHOD

This application claims the benefit, under 35 U.S.C. § 365 of International Application PCT/EP2006/060804, filed Mar. 16, 2006, which was published in accordance with PCT Article 21(2) on Oct. 12, 2006 in English and which claims the benefit of French patent application No. 0503369, filed Apr. 05, 2005.

1. BACKGROUND OF THE INVENTION

The invention relates to a method for locally adjusting a quantization step in the images of a sequence using a step for preanalysing the sequence of images.

2. DESCRIPTION OF THE PRIOR ART

This invention applies to the field of video compression and, in particular, selective compression. Any method of selective compression of images with regions of interest involves two mechanisms: an a priori selection mechanism and an a priori compression mechanism:
- the selection of the information is a visual attention mechanism which defines the location of the events of interest contained in the image and the relative importance of these events in relation to each other;
- the a priori compression mechanism characterizes the nature and the encoding of the image and the criteria for allocation of the encoding resources, i.e. bit rate or quality.

Any compression method involves a quantization method for quantizing the data to be encoded. The invention relates more particularly to the local adjustment of the quantization step for each region in an image. According to conventional approaches, the local adjustment of the quantization step is performed for each macroblock (or for each block of pixels) according to their psycho-visual importance within an image. These approaches are used in particular to quantize more strongly less important macroblocks and, conversely, preserve, by reducing the associated quantization step, the important macroblocks (i.e. the macroblocks that attract the eye). However, with these approaches, the reconstruction quality (i.e. after decoding) of an important macroblock can vary strongly from one image to the next, which is a problem for an observer. Furthermore, the reconstruction quality can also vary within a region of interest.

3. SUMMARY OF THE INVENTION

The object of the invention is to resolve at least one of the drawbacks of the prior art. The invention relates to a method for adjusting locally a quantization step in the images of a sequence of n images with respect to a setpoint quantization step (QP*). Each image comprises at least one region of interest and one potential masking region and each region possibly comprises a number of disjoint groups of pixels. The region of interest and the potential masking region are respectively encoded in a first and a second number of bits when they are quantized with the setpoint quantization step. According to the invention, the method comprises the following steps:
- calculating, for each image of the sequence, a first difference of bits between the second number of bits and the number of bits used to encode the potential masking region quantized with a first quantization step (QP_POT_MAX$_j$) higher than or equal to the setpoint quantization step (QP*), and a second difference of bits between the number of bits used to encode the region of interest quantized with a second quantization step (QP_ROI_MIN$_j$) lower than or equal to the setpoint quantization step (QP*) and the first number of bits; and
- in each image of the sequence, assigning to the potential masking region the first quantization step and if, over the n images of the sequence, the sum of the n first differences of bits ($G_{POT}$) is higher than the sum of the n second differences of bits ($D_{ROI}$), assigning the second quantization step to the region of interest and otherwise assigning to the region of interest a third quantization step higher than or equal to the second quantization step such that the sum of the n first differences of bits is distributed between the regions of interest of the images of the sequence according to a reconstruction quality criterion calculated for each image.

According to a specific embodiment, the first quantization step (QP_POT_MAX$_j$) is determined so as to ensure a first predefined reconstruction quality (PSNR$^{min}_{POT}$) of the potential masking region when the first quantization step is used for coding the potential masking region. The second quantization step (QP_ROI_MIN$_j$) is determined so as to ensure a second predefined reconstruction quality (PSNR$^{max}_{ROI}$) of the region of interest when the second quantization step (QP_ROI_MIN$_j$) is used for coding the region of interest.

Preferentially, if, over the n images of the sequence, the sum of the n first differences of bits ($G_{POT}$) is lower than the sum of the n second differences of bits ($D_{ROI}$), the sum of the n first differences of bits ($G_{POT}$) is distributed between the regions of interest of the n images of the sequence pro rata to the difference between the second predefined reconstruction quality (PSNR$^{max}_{ROI}$) and the reconstruction quality of the region of interest when the setpoint quantization step (QP*) is used for coding the region of interest.

According to another embodiment, the image further comprising a neutral region that possibly comprises disjoint groups of pixels, the setpoint quantization step (QP*) is assigned to the neutral region.

The invention also concerns a method for coding a sequence of n images comprising a step for transforming the n images in a set of coefficients, a step for quantizing each of the coefficients by a quantization step and a step for encoding the quantized coefficients wherein the quantization step is adjusted locally according to the method described above.

The invention also relates to a coding device for coding a sequence of n images comprising at least one region of interest and one potential masking region. The device comprises:
- means for transforming each of the n images in a set of coefficients;
- quantization means for quantizing the coefficients with a quantization step adjusted locally in each image of the sequence with respect to a setpoint quantization step (QP*), the region of interest and potential masking region being encoded in a first and a second number of bits respectively when they are quantized with the setpoint quantization step (QP*); and
- coding means for coding the quantized coefficients.

According to the invention, the quantization means comprise:
- mean for calculating, for each image of the sequence, a first difference of bits between the second number of bits and the number of bits used to encode the potential masking region quantized with a first quantization step (QP_POT_MAX$_j$) higher than or equal to the setpoint quantization step (QP*), and a second difference of bits between the number of bits used to encode the region of interest quantized with a second quantization step ($QP\_ROI\_MIN_j$) lower than or equal to the setpoint quantization step ($QP^*$) and the first number of bits; and means for, assigning to the potential masking region, in each image of the sequence, the first quantization step and if, over the n images of the sequence, the sum of the n first differences of bits ($G_{POT}$) is higher than the sum of the n second differences of bits ($D_{ROI}$), for assigning the second quantization step to the region of interest and otherwise for assigning to the region of interest a third quantization step higher than or equal to the second quantization step such that the sum of the n first differences of bits is distributed between the regions of interest of the images of the sequence according to a reconstruction quality criterion calculated for each image.

Advantageously, the coding device further comprises rate control means providing the quantization means with the setpoint quantization step ($QP^*$).

4. LIST OF FIGURES

Figure 2:
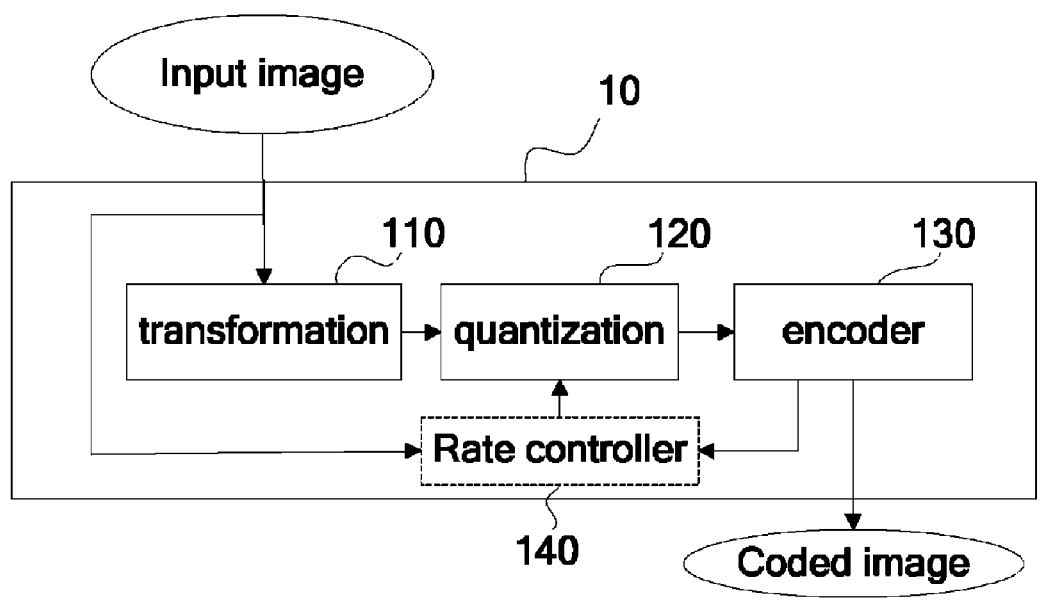

The invention will be better understood and illustrated by means of exemplary embodiments and advantageous implementations, by no means limiting, with reference to the appended figures, in which:

FIG. 1 illustrates the trend of the PSNR of a region of interest for each image of the sequence to be encoded; and FIG. 2 depicts a coding device according to the invention.

5. DETAILED DESCRIPTION OF THE INVENTION

The invention relates to a method of locally adjusting a quantization step for each area or region of interest (i.e. regions attracting more attention) of an image with respect to a setpoint quantization step ($QP^*$). The image that is part of a sequence of several images is made up of blocks of pixels. By favouring a spatial region of interest in the method of locally adapting the quantization step at the expense of other regions of the image, the visual quality of the region concerned for a given overall bit rate is enhanced. Based on a selection of regions of interest in an image, the quantization step is adjusted locally according to the interest of these regions. This adjustment is performed in such a way as to compress more strongly the regions of low importance and to redistribute, along the sequence, the encoding resources (i.e. number of bits) that might not be used, to the regions of interest. This redistribution of bits from one image to another makes it possible to obtain a reconstruction quality (i.e. of quality after decoding) that is more stable for the regions of interest. The method according to the invention uses an image sequence preanalysis step in particular to characterize the requirements in terms of number of bits of the region of interest throughout the sequence and, consequently, to smooth the reconstruction quality of the region of interest over the whole sequence.

More specifically, the method according to the invention can be used to transfer bit rate from a region of non-interest to a region of interest. For this, the proposed solution uses the variation in the quantization step QP for each region in the image or local adjustment of the quantization step. This adjustment is made with respect to an initial setpoint of the value of the quantization step denoted $QP^*$ (for example, derived from bit rate regulation for each image) which corresponds to a setpoint bit rate $D^*$. This quantization step value may, if necessary, vary from image to image during the sequence. More specifically, according to the invention, the quantization step for each region of the image will be modified according to the visual interest of the region. A positive variation of the quantization step provides for a stronger compression, i.e. a gain in bit rate at the cost of a loss in quality. A negative variation provides for a finer compression, i.e. an enhanced reconstruction quality, at the cost of an increase in encoding cost.

Consequently, the method requires knowledge of a priori information on the content. This a priori information used by the method according to the invention falls into two categories. The first category of a priori information on the content concerns the location, in each image of the sequence, of the region attracting more attention, or the region of interest. This region may be made up of disjoint groups of blocks of pixels; it is, however, defined as one and the same region. This information can be given by a binary interest map I indicating, for each block $b_i$ in the image, its level of interest for the human visual system: $I(b_i)=1$ for a block $b_i$ of interest and $I(b_i)=0$ for a block $b_i$ of non-interest. This map can be obtained, for example, by thresholding a saliency map. A saliency map is a map that indicates, for each pixel in the image, its perceptual interest. This map can be constructed taking into account a variety of information, for example motion information. The greater the value associated with a pixel, the more the pixel attracts the eye. In order to obtain a saliency value for each block, it is possible to average, for a given block, the values associated with the pixels belonging to that block, or even to take the median value of the saliency values. More generally speaking, the invention can be applied to the case of interest non binary maps that characterizes for each block $b_i$ its level of interest. The second category of a priori information on the content concerns the location, in each image of the sequence, of the region in the image which has a strong masking capability on the visual artefacts. This region may be made up of disjoint groups of blocks of pixels. The lossy compression methods used in digital video systems produce artefacts, the visibility of which depends strongly on the content of the images processed. The contrast masking effect translates this modification of the visibility of a signal into the presence of another signal. This modification can go in the direction of a reduction of the visibility threshold (facilitation), or even in the direction of an increase in the visibility threshold (masking). To limit the appearance of new artefacts in the blocks that are part of the region of non-interest, a priori information on the content is also given by a binary map P indicating, for each block $b_i$, its visual masking capability: $P(b_i)=1$ for a block with strong masking capability and $P(b_i)=0$ for a block with weak masking capability. This map can be obtained, for example, by thresholding an activity map. An activity map is a map that indicates, for a given block, its level of activity. This level can be calculated by measuring, for example, the variance of the block. In the rest of the document, the set of blocks $b_i$ of non-interest in the image having a strong masking capability is called "potential masking region". The set of blocks $b_i$ of non-interest that do not belong to the potential masking region is called "neutral region". The two binary maps respectively relating to the location of the region of interest and the region with strong masking capability are coupled in order to obtain a single map $I_{final}$ used for locally adjusting the quantization step and which associates with each block $b_i$ in the image a value 0, 1 or 2 as follows:

$$I_{Final}(b_i) = \begin{cases} 2 & \text{if } I(b_i) = 1: \text{region of interest} \\ 1 & \text{if } P(b_i) = 1 \text{ and } I(b_i) = 0: \text{Potential masking region} \\ 0 & \text{otherwise: Neutral region} \end{cases}$$

With:
- $I_{Final}$ being the new map transmitted to the encoder indicating the region of interest and also the potential masking region from which will be applied the transfer of bits;
- P being the binary map defining the potential masking region; and
- I being the binary map defining the region of interest and of non-interest.

The method also makes use of PSNR(QP) curves (curves representing the peak signal-to-noise ratio as a function of the quantization step) and NbBit(QP) curves (curves representing the number of bits as a function of the quantization step) that are specific and associated with each of the regions of interest and potential masking regions in each image of the sequence. The PSNR is a criterion that is used to characterize an image quality. In this case, the PSNR is used to characterize the reconstruction quality after decoding an image, a block or a region in an image. The PSNR is then defined as follows:

$$PSNR = -10 \log_{10}\left(\frac{(SSE)}{N \cdot M \cdot 255^2}\right)$$

in which SSE is the sum of the squared errors. The SSE is defined for a block by the sum on the block of the pixel-by-pixel differences between the values associated with the pixels in the source image and the values associated with the corresponding pixels in the reconstructed image, i.e. the decoded image.

According to the invention, other quality criteria can be used. Before redistributing bits from certain regions of the image to other regions, a learning step for each image j of the sequence is needed in order to construct, around the value QP*, the portions of the curves defined above. These portions of curves may also be provided by external means for example through data files. It consists in encoding each block of pixels (for example, macroblock of size 16 by 16 pixels) belonging either to the region of interest, or to the potential masking region of an image j, using three different quantization steps: QP*−L, QP*+K and QP*. After reconstruction (i.e. decoding) of the encoded blocks belonging to the region of interest, the data (PSNR and NbBit) relating to these blocks for a given quantization step value (QP*−L, QP*+K or QP*) is averaged in order to obtain, for the region of interest in the image j and for each of the three quantization step values, a PSNR value ($PSNR^j_{ROI}$) and a number of bits value ($NbBit^j_{ROI}$). Similarly, the data relating to the blocks belonging to the potential masking region is averaged in order to obtain, for the potential masking region in the image j and for each of the three quantization step values, a PSNR value ($PSNR^j_{POT}$) and a number of bits value ($NbBit^j_{POT}$). The curves $PSNR^j(QP)$ and $NbBit^j(QP)$ are then interpolated by linear interpolation between the three values QP*−L, QP*+K and QP* in order to obtain, for the image j: for the region of interest, a curve $PSNR^j_{ROI}(QP)$ and a curve $NbBit^j_{ROI}(QP)$, and for the potential masking region, a curve $PSNR^j_{POT}(QP)$ and a curve $NbBit^j_{POT}(QP)$.

The principle of the transfer or redistribution of bits consists in compressing more strongly (compared to an initial encoding based on a setpoint quantization step QP*) the blocks belonging to the potential masking region and in using for encoding the region of interest, the bits not used for encoding the potential masking region (compared to $NbBit^j_{POT}(QP*)$). According to the method, a stronger quantization step can be used to quantize a block of the potential masking region, provided that a minimum predefined value $PSNR^{min}_{POT}$ of the reconstruction quality associated with a potential masking region (for example 20 dB) is respected. Similarly, a maximum predefined value of the reconstruction quality $PSNR^{max}_{ROI}$ is fixed for the region of interest (for example, 35 dB). These values can be fixed automatically or manually (for example, by an operator). The method according to the invention consists in locally adapting the quantization step by transferring bits from the potential masking region to the region of interest while being careful to maintain an overall bit rate for the sequence that is roughly similar to the setpoint bit rate D*. The method according to the invention uses a first sequence preanalysis step. In this step, the number of bits that can be recovered or saved over the whole sequence by increasing the quantization step assigned to the potential masking region is calculated, and likewise the number of additional bits required over all of the sequence to encode the region of interest with a lower quantization step is calculated. To this end, for each region involved in the selective compression system (i.e. the region of interest and the potential masking region) and for each image j of the sequence, a set of so-called valid values for the quantization step is defined. These values are determined from PSNR(QP) curves (modelled for each region and for each image) so as to respect a reconstruction quality satisfying the PSNR requirements, minimum and maximum respectively, in the potential masking region and the region of interest. For the potential masking region in the image j, the values of the quantization step that can be assigned to the potential masking region vary between the setpoint value denoted QP* and the highest value (denoted $QP\_POT\_MAX_j$) that makes it possible to guarantee the minimum reconstruction quality $PSNR^{min}_{POT}$. The same principle is applied to the region of interest. The values of the quantization step that can be assigned to the region of interest in the image j vary between the smallest value of the quantization step (denoted $QP\_ROI\_MIN_j$) that makes it possible to achieve the target reconstruction quality $PSNR^{max}_{ROI}$ and the setpoint value QP*.

According to the invention, the preanalysis step consists initially in collecting, for each image of the sequence, the requirements in terms of number of bits of the region of interest and the number of bits that the potential masking region can provide. Secondly, the transfer of bits over will be based on the possibilities offered by the potential masking region throughout the sequence. Two eventualities can be considered: either the potential masking region can satisfy the request, or it cannot. In the latter case, the redistribution of bits is performed in proportion to the PSNR deficit of the region of interest with respect to a PSNR-based quality setpoint.

In the preanalysis, for each image j of the sequence, the number of bits that can be saved based when encoding the potential masking region with $QP\_POT\_MAX_j$ is determined from the curve $NbBit^j_{POT}(QP)$ associated with said region. The requirement of the region of interest in terms of additional bits to achieve the target reconstruction quality $PSNR^{max}_{ROI}$ is also evaluated. If the term $gain_j(QP\_POT\_MAXj)$ is used to denote the number of bits saved from the potential masking region of the image j for an encoding with the maximum quantization step providing a minimum reconstruction quality, $$gain_j(QP\_POT\_MAX_j) = NbBit^j_{POT}(QP^*) - NbBit^j_{POT}(QP\_POT\_MAX_j)$$

With:

$NbBit^j_{POT}(QP)$ being the curve NbBit(QP) associated with the potential masking region of the image j.

$QP\_POT\_MAX_j$ being the value of the quantization step that can be used to provide a minimum reconstruction quality of the potential masking region.

If the term $requirement_j(QP\_ROI\_MIN_j)$ is used to denote the number of bits required by the region of interest of the image j to satisfy a target reconstruction quality, $$requirement_j(QP\_ROI\_MIN_j) = NbBit^j_{ROI}(QP\_ROI\_MIN_j) - NbBit^j_{ROI}(QP^*)$$

With:

$NbBit^j_{ROI}(QP)$ being the curve NbBit(QP) associated with the region of interest of the image j; and $QP\_ROI\_MIN_j$ being the value of the quantization step that can be used to ensure a reconstruction quality of the region of interest approximating to the target reconstruction quality.

In this image analysis, the number of bits saved on the potential masking region (denoted $G_{POT}$) and the number of bits required by the region of interest (denoted $D_{ROI}$) are aggregated throughout the sequence.

$$G_{POT} = \sum_{j=0}^{N-1} (gain_j(QP\_POT\_MAX_j))$$

$$D_{ROI} = \sum_{j=0}^{N-1} (requirement_j(QP\_ROI\_MIN_j))$$

with N being the number of images to be encoded.

Furthermore, the quality difference (evaluated by the PSNR in our approach, but not restrictively) between the reconstruction quality of the region of interest quantized with the setpoint step and the target reconstruction quality $PSNR^{max}_{ROI}$ is calculated for each image j of the sequence as illustrated by FIG. 1. Let's $\Delta PSNR_{ROI}$ be the aggregate value of these quality differences throughout the sequence, thus $$\Delta PSNR_{ROI} = \sum_{j=0}^{N-1} \delta PSNR^j_{ROI}$$

in which:

$\delta PSNR^j_{ROI} = MAX(0, PSNR^{max}_{ROI} - PSNR^j_{ROI}(QP^*))$ is the quality difference of the region of interest of the image j;

N is the number of images of the sequence to be encoded; and $PSNR^j_{ROI}(QP^*)$ is the value of the PSNR of the region of interest of the image j.

At the end of this preanalysis, the following values are known:

at image level:

the quality distance of the region of interest from the target reconstruction quality; and the quantization steps $QP\_POT\_MAX_j$ and $QP\_ROI\_MIN_j$ that could be applied to the potential masking region and to the region of interest respectively to achieve the minimum reconstruction quality $PSNR^{min}_{POT}$ and the target reconstruction quality $PSNR^{max}_{ROI}$ respectively.

at sequence level:

the aggregate value $\Delta PSNR_{ROI}$ of the quality differences of the region of interest compared to the target reconstruction quality;

the total number of bits saved on the potential masking region: $G_{POT}$;

and the total number of bits required by the region of interest to achieve the target reconstruction quality: $D_{ROI}$.

The aim of the second step of the method is to assign a quantization step for each region in each image of the sequence by redistributing the number of bits saved throughout the sequence, $G_{POT}$, derived from the encoding of the potential masking region with the quantization step $QP\_POT\_MAX_j$, in order, where appropriate, to satisfy the target reconstruction quality for the region of interest. $G_{POT}$ was calculated in the preanalysis step. This distribution is done, in practice, according to the capabilities offered by the potential masking region: either the potential masking region can satisfy the requirement (case No. 1), or it cannot (case No. 2).

Case No. 1: $G_{POT} \geq D_{ROI}$

The total number of bits saved throughout the sequence is greater than or equal to the total number of bits required by the region of interest to achieve a target reconstruction quality. The redistribution throughout the sequence of the bits saved from the potential masking region to the region of interest can be done. In this case, the overall bit rate can be reduced.

The local adjustment of the quantization steps of the regions of interest and of the potential masking region is performed directly for each image j based on the respective values $QP\_ROI\_MIN_j$ and $QP\_POT\_MAX_j$, i.e. $QP\_ROI\_MIN_j$ is assigned to the potential masking region and $QP\_POT\_MAX_j$ is assigned to the region of interest.

Case No. 2: $G_{POT} < D_{ROI}$

The bit rate saving aggregated throughout the sequence cannot fully satisfy the requirement of the region of interest.

To retain an overall bit rate after local adjustment of the quantization step that is roughly similar to the setpoint bit rate (obtained by the setpoint quantization step), a new quantization step value for the region of interest $QP\_ROI_j$ must be evaluated for each image j, greater than the current value $QP\_ROI\_MIN_j$. The redistribution of bits is then done in proportion to the PSNR deficit of the region of interest with respect to a quality setpoint based on the PSNR. For each image j, the number of additional bits $NbAdditionalBits^j_{ROI}$ added for the encoding of the current region of interest is calculated from the total number of bits obtained from the potential masking region $G_{POT}$ pro rata to the current quality difference $\delta PSNR^j_{ROI}$ as follows:

$$NbAdditionalBits^j_{ROI} = \frac{\delta PSNR^j_{ROI}}{\Delta PSNR_{ROI}} \times G_{POT}$$

From the curve $NbBit^j_{ROI}(QP)$, the value of the quantization step $QP\_ROI_j$ of the region of interest that can be used to approach the new target number of bits $NbBit^j_{ROI}(QP^*) + NbAdditionalBits^j_{ROI}$ is estimated.

The local adjustment of the quantization steps of the region of interest and of the potential masking region is performed for each image j based on respective values $QP\_ROI_j$ and $QP\_POT\_MAX_j$. As for the blocks of the neutral regions, they are considered to be neutral with respect to a selective encoding strategy, i.e. the quantization step assigned to these blocks corresponds to the setpoint quantization step QP*, i.e., there is no local adaptation of the quantization step.

The invention also relates to a coding method for coding a sequence of n images implementing the quantization method according to the invention. The coding method thus comprises a step for transforming the n images of the sequence in a set of coefficients, for example using a DCT, a step for quantizing said coefficients by a quantization step that is adapted locally within the n images of the sequence according to the method described above and a step for encoding said quantized coefficients (e.g. using an entropy coding process).

The invention also relates to a coding device 10 for coding a sequence of images depicted on FIG. 2. Only the essential modules are depicted on FIG. 2 and described hereinafter. The coding device comprises a module 110 to transform the source images at the input of the coding device in a set of coefficients (e.g. DCT coefficients). The module 110 implements for example a DCT transform. The coefficients are then quantized by a quantization module 120 in order to obtain quantized coefficients. The quantization module 120 is adapted to implement the method of local adjustment of quantization step according to the invention. More specifically, the quantization module 120 assigns a quantization step to the region of interest in each image of the sequence either so as to ensure the target reconstruction quality if the number of bits saved $G_{POT}$ is sufficient, or so as to this number of saved bits $G_{POT}$ is distributed between the regions of interest along the whole sequence pro rata to the difference between the target reconstruction quality and the setpoint reconstruction, i.e. the quality obtained when quantizing said regions of interest with QP*. The quantized coefficients are then encoded by a coding module 130 known by the skilled person, e.g. an entropic encoder. According to a specific embodiment, the coding device 10 comprises a rate control module 140. The module 140 is able to provide the quantization module 120 with the setpoint quantization step QP*.

Of course, the invention is not limited to the embodiments mentioned above. In particular, those skilled in the art can add any variant to the embodiments disclosed and combine them to benefit from their various advantages. Criteria other than the conventional PSNR can be used to characterize the reconstruction quality of an image, of a block of pixels or of a region in an image, such as, for example, a PSNR weighted according to the variance, a criterion based on a psycho-visual modelling. Similarly, the curves of PSNR(QP) and NbBit(QP) can be obtained by means other than those described. Thus, more than three quantization steps can be used to interpolate the curves. Similarly, another type of interpolation can be used such as, for example, a polynomial interpolation.

The interest maps can be non-binary maps, characterizing, for each block in an image, its higher or lower level of interest. These maps can be used to define a number of regions of interest in an image, the bits being reallocated for each region according to its level of interest.

The invention claimed is:

1. Method for adjusting locally a quantization step in the images of a sequence of n images relative to a setpoint quantization step, said image comprising at least one region of interest and one potential masking region, each of said regions possibly comprising a number of disjoint groups of pixels, said region of interest and potential masking region being respectively encoded in a first and a second number of bits when they are quantized with said setpoint quantization step, wherein it comprises the following steps:

calculating, for each image of the sequence, a first difference of bits between said second number of bits and the number of bits used to encode said potential masking region quantized with a first quantization step higher than or equal to the setpoint quantization step, and a second difference of bits between the number of bits used to encode said region of interest quantized with a second quantization step lower than or equal to the setpoint quantization step and said first number of bits; and in each image of the sequence, assigning to the potential masking region said first quantization step and if, over said n images of the sequence, the sum of the n first differences of bits is higher than the sum of the n second differences of bits, assigning said second quantization step to said region of interest and otherwise assigning to said region of interest a third quantization step higher than or equal to said second quantization step such that the sum of said n first differences of bits is distributed between the regions of interest of the images of the sequence according to a reconstruction quality criterion calculated for each image.

2. Method according to claim 1, wherein said first quantization step is determined so as to ensure a first predefined reconstruction quality of said potential masking region when said first quantization step is used for coding said potential masking region.

3. Method according to claim 1, wherein said second quantization step is determined so as to ensure a second predefined reconstruction quality of said region of interest when said second quantization step is used for coding said region of interest.

4. Method according to claim 3, wherein if, over said n images of the sequence, the sum of said n first differences of bits is lower than the sum of said n second differences of bits, the sum of said n first differences of bits is distributed between the regions of interest of said n images of the sequence pro rata to the difference between said second predefined reconstruction quality and the reconstruction quality of said region of interest when said setpoint quantization step is used for coding said region of interest.

5. Method according to claim 1, wherein, said image further comprising a neutral region that possibly comprises disjoint groups of pixels, the setpoint quantization step is assigned to said neutral region.

6. Method for coding a sequence of n images comprising a step for transforming said n images in a set of coefficients, a step for quantizing each of said coefficients by a quantization step and a step for encoding said quantized coefficients wherein said quantization step is adjusted locally according to claim 1.

7. Coding device for coding a sequence of n images comprising at least one region of interest and one potential masking region, each of said regions possibly comprising a number of disjoint groups of pixels, said device comprising:

means for transforming each of said n images in a set of coefficients;

quantization means for quantizing said coefficients with a quantization step adjusted locally in each image of said sequence with respect to a setpoint quantization step, said region of interest and potential masking region being encoded in a first and a second number of bits respectively when they are quantized with said setpoint quantization step;

coding means for coding said quantized coefficients;

wherein said quantization means comprise :

mean for calculating, for each image of the sequence, a first difference of bits between said second number of bits and the number of bits used to encode said potential masking region quantized with a first quantization step higher than or equal to the setpoint quantization step, and a second difference of bits between the number of bits used to encode said region of interest quantized with a second quantization step lower than or equal to the setpoint quantization step and said first number of bits; and means for, assigning to the potential masking region, in each image of the sequence, said first quantization step and if, over said n images of the sequence, the sum of the n first differences of bits is higher than the sum of the n second differences of bits, for assigning said second quantization step to said region of interest and otherwise for assigning to said region of interest a third quantization step higher than or equal to said second quantization step such that the sum of said n first differences of bits is distributed between the regions of interest of the images of the sequence according to a reconstruction quality criterion calculated for each image.

8. Coding device according to claim 7 further comprising rate control means providing said quantization means with said setpoint quantization step.

* * * * *